US008555277B2

(12) United States Patent
Cao et al.

(10) Patent No.: US 8,555,277 B2
(45) Date of Patent: Oct. 8, 2013

(54) METHOD AND APPARATUS FOR ACTIVATING A VIRTUAL MACHINE IN A VIRTUAL SOLUTION

(75) Inventors: Bao Hua Cao, Los Angeles, CA (US); Le He, Beijing (CN); Xing Jin, Beijing (CN); Jose Ortiz, Research Triangle Park, NC (US); Yang Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/095,988

(22) Filed: Apr. 28, 2011

(65) Prior Publication Data

US 2011/0271280 A1 Nov. 3, 2011

(30) Foreign Application Priority Data

Apr. 29, 2010 (CN) .......................... 2010 1 0163301

(51) Int. Cl.
*G06F 9/455* (2006.01)
(52) U.S. Cl.
USPC ............................................................. 718/1
(58) Field of Classification Search
None
See application file for complete search history.

(56) References Cited

U.S. PATENT DOCUMENTS

| | | | |
|---|---|---|---|
| 6,725,452 B1 | 4/2004 | Te'eni | |
| 2004/0230978 A1* | 11/2004 | Kraiss et al. | 718/100 |
| 2005/0166196 A1 | 7/2005 | Grier | |
| 2005/0278579 A1 | 12/2005 | Hill | |
| 2006/0271924 A1 | 11/2006 | Calcaterra | |
| 2006/0277542 A1* | 12/2006 | Wipfel | 717/174 |
| 2008/0189717 A1 | 8/2008 | Agarwal et al. | |
| 2009/0119642 A1 | 5/2009 | Brendle et al. | |
| 2009/0165015 A1 | 6/2009 | Goel | |
| 2009/0172662 A1* | 7/2009 | Liu | 718/1 |
| 2009/0293056 A1 | 11/2009 | Ferris | |
| 2010/0318609 A1* | 12/2010 | Lahiri et al. | 709/205 |
| 2011/0004708 A1* | 1/2011 | Kondo et al. | 710/38 |

FOREIGN PATENT DOCUMENTS

| | | |
|---|---|---|
| CN | 101470621 A | 7/2009 |
| WO | 2010014431 A2 | 2/2010 |

OTHER PUBLICATIONS

Yin et al, Using IBM Tivoli Provisioning Manager to Deploy Composite Virtual Appliances, Feb. 27, 2008, http://www.ibm.com/developerworks/websphere/techjournal/0802_willenborg/0802_willenborg.html.
Konstantinou et al., An Architecture for Virtual Solution Composition and Deployment in Infrastructure Clouds, http://portal.acm.org/citation.cfm?id=1555339&dl=GUIDE&coll=GUIDE&CFID=78301419&CFTOKEN=80567091.

(Continued)

*Primary Examiner* — Emerson Puente
*Assistant Examiner* — Gregory A Kessler
(74) *Attorney, Agent, or Firm* — Cantor Colburn LLP; Dwayne Nelson

(57) ABSTRACT

Embodiments of the present invention relate to a method for activating virtual machines in a virtual solution, including: for each virtual machine, activating activation items in a first activation item set independently of other virtual machines; and for at least one virtual machine, activating activation items in a second activation item set in coordination with activation of activation items of at least another virtual machine. There is further provided an apparatus for activating virtual machines in a virtual solution, including: a first activator for activating, for each virtual machine, activation items in a first activation item set independently of other virtual machines; and a second activator for activating, for at least one virtual machine, activation items in a second activation item set in coordination with activation of activation items of at least another virtual machine.

9 Claims, 9 Drawing Sheets

(56) References Cited

OTHER PUBLICATIONS

Ja et al., Automating Deployment and Activation of Virtual Appliances for IBM AIX and Power Systems, Apr. 29, 2009, http://www.ibm.com/developerworks/websphere/library/techarticles/0904_ja/0904_ja.html.

http://www.datasynapse.com/stuff/contentmgr/files/0/7c258c4b78673d80c663529f86a02405/download/cloud_cloud_tech.pdf.

Chinese Office Action; CN Application No. 201010163301.8; Date Mailed: May 3, 2013, pp. 1-7.

* cited by examiner

METHOD AND APPARATUS FOR ACTIVATING A VIRTUAL MACHINE IN A VIRTUAL SOLUTION

CROSS-REFERENCE TO RELATED APPLICATION

This application claims priority under 35 U.S.C. §119 from Chinese Patent Application No. 201010163301.8, filed Apr. 29, 2010, the entire contents of which are incorporated herein by reference.

FIELD OF THE INVENTION

Embodiments of the present invention relate to data processing, and more particularly to a method and an apparatus for activating activation items on at least one virtual machine in a virtual solution, and a relevant computer program product.

BACKGROUND OF THE INVENTION

Evolution of computer technology increases user demands on computer software. Moreover, a user usually has to separately install a plurality of desired software products to a target hardware device so as to completely implement a required system configuration. Such situation can also exist that a plurality of software products to be installed has a mutual dependency relationship there between. For example, software product 1 is dependent on software product 2 (namely, software product 1 can only be correctly installed after software product 2 is correctly installed), while software product 2 is further dependent on software product 3, and so forth. At this point, the installation sequence of software products has to be determined empirically by a technical engineer, for example, first installing software product 3, then installing software product 2, and finally installing software product 1.

It is a quite time-consuming and complicated work to implement functional configuration by such manual installation of software, because the technical engineer must first determine an installation sequence of respective software products, and additionally, after respective installations are installed, it is also required to configure the software according to corresponding installation configuration parameters of the software. In other words, for such operation of manual installation of software, the technical engineer must have rich experience for correctly configuring each installed software product. Additionally, a great amount of repetitive manual operation is required for performing installation to multiple devices. Therefore, the prior art has proposed solutions which can publish software or applications in a manner of virtual images, i.e., instantiating a pre-configured virtual image to replace fussy human labor in manual installation and configuration of a software product.

Methods for instantiating a pre-configured virtual image already exist in the prior art. Although the repetitive human labor issue can be resolved to a certain extent by these methods, the difficulty being confronted, currently, is that virtual image configuration and instantiation can only be performed to software products with a simple dependency, while it is impossible to perform instantiation operation when a virtual solution relates to multiple virtual machines and software products on the multiple virtual machines further have complicated dependencies.

The instantiating process after deploying a virtual image is called activating the virtual image. In a practical application environment, activation of multiple virtual machines in a virtual solution frequently occurs, and a virtual machine-level cyclic dependency can also exist between various activation items in the multiple virtual machines.

SUMMARY OF THE INVENTION

It is urgently desirable to provide a method for activating multiple virtual machines in a virtual solution conveniently and quickly; and it is also desirable to enable a user without expertise in software application configuration to conveniently operate.

According to one embodiment of the present invention, there is provided a method for activating virtual machines in a virtual solution. This method includes: for each virtual machine, activating activation items in a first activation item set independently of other virtual machines; for at least one virtual machine, activating activation items in a second activation item set in coordination with activation of activation items of at least another virtual machine.

According to another embodiment of the present invention, there is provided an apparatus for activating virtual machines in a virtual solution. This apparatus includes: a first activator, for each virtual machine, for activating activation items in a first activation item set independently of other virtual machines; and a second activator, for at least one virtual machine, for activating activation items in a second activation item set in coordination with activation of activation items of at least another virtual machine.

DETAILED DESCRIPTION OF EMBODIMENTS

The flowcharts and block in the figures illustrate the system, methods, as well as architecture, functions and operations executable by a computer program product according to the embodiments of the present invention. In this regard, each block in the flowcharts or block can represent a module, a program segment, or a part of code, which contains one or more executable instructions for performing specified logic functions. In some alternative implementations, functions indicated in blocks can occur in an order differing from the order as illustrated in the figures. For example, two blocks illustrated consecutively can be performed in parallel substantially or in an inverse order. This depends on relevant functions. Additionally, each block in the block diagrams and/or flowcharts and a combination of blocks in the block diagrams and/or flowcharts can be implemented by a dedicated hardware-based system for performing specified functions or operations or by a combination of dedicated hardware and computer instructions.

In one embodiment, to activate various virtual machines in a virtual solution, first, for each virtual machine, activation items in a first activation item set are activated independently of other virtual machines; second, for at least one virtual machine, activation items in a second activation item set are activated in coordination with activation of activation items of at least another virtual machine.

In one embodiment, there is provided an apparatus for activating virtual machines in a virtual solution. The apparatus includes a first activator and a second activator. In this apparatus, the first activator is for activating, for each virtual machine, activation items in a first activation item set independently of other virtual machines; while the second activator is for activating, for at least one virtual machine, activation items in a second activation item set in coordination with activation of activation items of at least another virtual machine. By using these embodiments, both various activation items having external dependencies (or "across" dependencies) relationships between different virtual machines in a virtual solution, and various activation items having cyclic dependency relationships among different virtual machines in a virtual solution, can be activated conveniently and quickly.

According to another embodiment of the present invention, the activation is performed based on activation script of activation items to be activated.

The method according to another embodiment of the present invention further includes: generating a first activation item set for each virtual machine by analyzing dependency relationships between activation items describing various virtual machines in the virtual solution.

Figure 1:
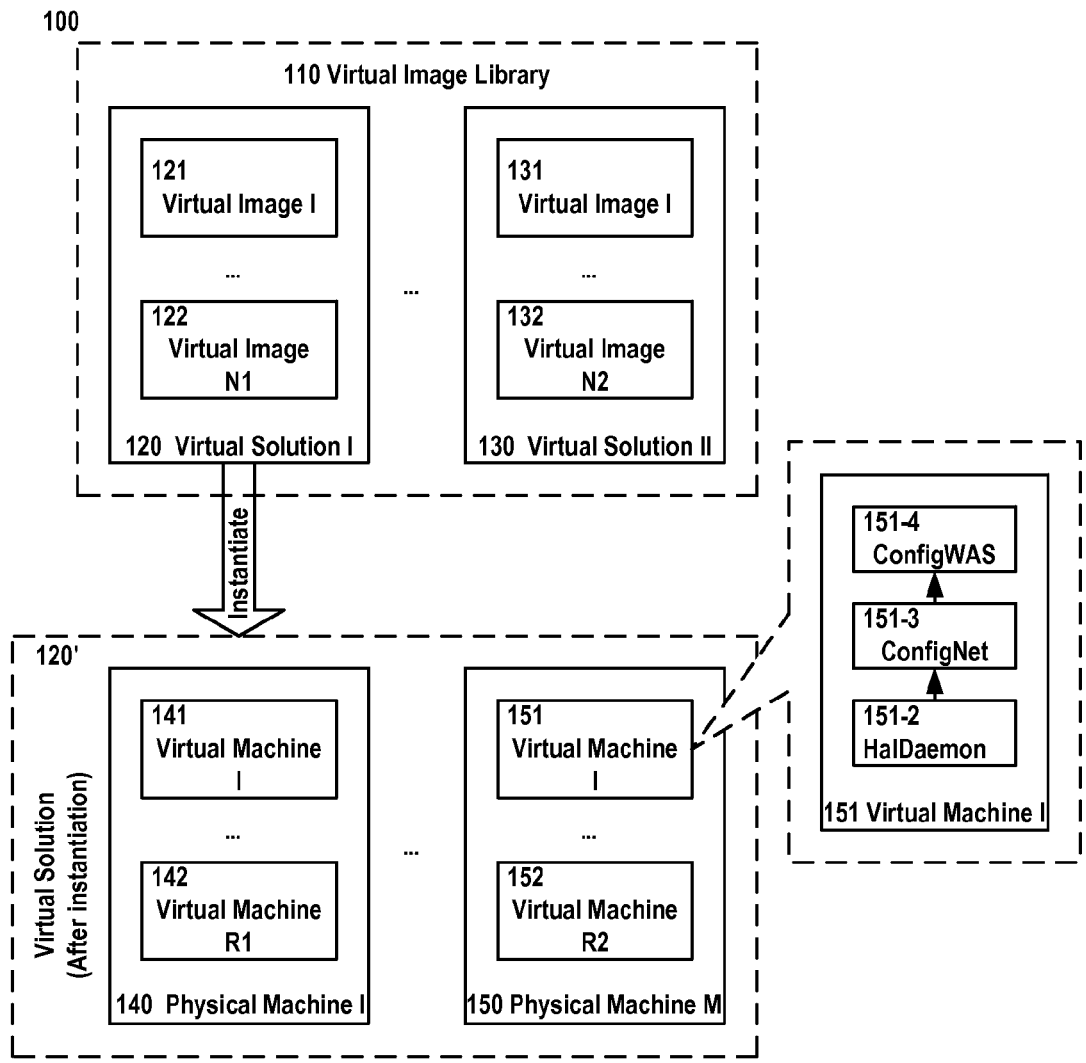
FIG. 1 schematically illustrates a system block diagram for instantiating a virtual solution.

Now, operation of one embodiment of the present invention can be described in detail with reference to FIG. 1. FIG. 1 schematically illustrates a system block diagram 100 for instantiating a virtual solution. As illustrated in FIG. 1, dash-line blocks 110 and 120' illustrate block diagrams before, during, and after instantiating the virtual machine, respectively. As illustrated in the dash-line block 110, the virtual solution can be stored in a virtual image library in the form of at least one virtual image before being instantiated. The virtual image library here can assume various storage manners. For example, the virtual image library can be stored in a computer storage medium including electrical, magnetic, optical, electromagnetic, infrared, or semi-conductor system (or apparatus or device) or propagation medium.

Before instantiation, a virtual image is data stored in a computer storage medium, which cannot perform various designed functions; and only after the virtual machine is deployed to a specific physical machine through an instantiation process, a pre-designed function can be performed with resources of the physical machine such as CPU.

Referring back to FIG. 1, the dash-line block 110 illustrates a virtual solution I 120 and a virtual solution II 130, respectively, wherein the two virtual solutions are stored in a virtual image library 110. Each virtual solution can also include different amounts of virtual images. For example, the virtual solution I 120 can include virtual image I 121 to virtual image N1 122, with N1 virtual images in total; while virtual solution II 130 can include virtual image I 131 to virtual image N2 132, with N2 virtual images in total. FIG. 1 only schematically illustrates a scenario of two virtual solutions being included in the virtual image library 110. According to embodiments of the present invention, the virtual image library 110 can comprise any arbitrary amount of virtual solutions.

At the lower portion of FIG. 1 is illustrated a virtual solution 120' after instantiating the virtual solution I 120. After the virtual solution I 120, as stored in the virtual image library 110, is subjected to the instantiation process, the virtual images therein are combined with physical machine I 140 to physical machine M 150, respectively, with virtual machines formed on respective physical machines. For example, virtual machine I 141 to virtual machine R1 142 are formed on the physical machine I 140, and virtual machine I 151 to virtual machine R2 152 are formed on the physical machine M 150.

The quantitative relationship among the virtual images and virtual solutions and the quantitative relationship among the virtual machines and physical machines as illustrated in FIG. 1 are merely illustrative. For example, the virtual image library 110 can comprise M amount of virtual solutions, while each virtual solution can comprise any arbitrary amount of virtual images, respectively. Additionally, after virtual images in a same virtual solution are subjected to an instantiation process, they can be located on at least one physical machine. In other words, the relationships between virtual solutions and physical machines are not limited to a one-to-one correspondence relationship.

FIG. 1 further illustrates a schematic diagram of various activation items in the virtual machine M 150. Each virtual machine can include at least one activation item. For example, the virtual machine I 151 can include two activation items, i.e., ConfigWAS 151-4 and ConfigNET 151-3, respectively, while HalDaemon 151-2 is a system service, and the activation item ConfigNET 151-3 is activated only when the system service is started first.

For the sake of depiction, terms involved in this description will be explained first.

Activating refers to a process of instantiating a virtual solution. A virtual solution, before being activated, can be data storage containing at least one virtual image, while after being activated, it can be at least one virtual machine running on at least one physical machine. For example, as illustrated in FIG. 1, the virtual solution I 120, after being activated, can be multiple virtual machines running on physical machine I 140 to physical machine M 150.

Activation Item refers to a pre-customized software assembly for starting an application, software or system. An activation item can have various pre-designed functions. For example, the WebSphere Application Server (WAS) for configuring IBM Corporation can be regarded as an activation item that functions as a basis for the IBM WebSphere software platform and a key component of a service-oriented systematic structure. Another example for an activation item is for configuring IBM Tivoli Monitor (abbreviated as ITM), or for configuring IBM DB2 database, and for configuring ConfigNET connection assembly, etc.

Dependency relationship refers to a relationship between activation items of a virtual machine. If activation of activation item 1 must be conditioned with activation of activation item 2, then it is called activation item 1 being dependent on activation item 2. This dependency can be either a direct dependency or an indirect dependency.

Figure 2A:
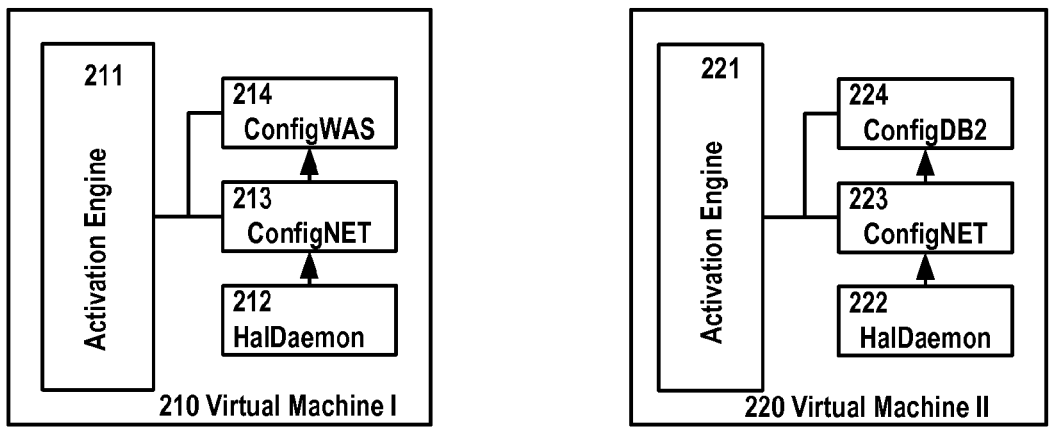
FIGS. 2A to 2C schematically illustrate a diagram of dependencies between multiple activation items of each virtual machine in a virtual solution.

A plurality of dependency relationships can exist between various activation items of a virtual machine. Hereinafter, various relationships between activation items can be described in detail with reference to FIGS. 2A to 2C. With reference to FIG. 2A, it illustrates an internal dependency relationship between various activation items in a single virtual machine. As illustrated in the virtual machine I 210 at the left side of FIG. 2A, it includes a service HalDaemon 212 and two activation items, i.e., ConfigNET 213 and ConfigWAS 214. From the arrows in the figure, it is seen that various activation items have dependency relationships therebetween: ConfigNET 213 is dependent on starting the service HalDaemon 212 (this direct connection relationship between the ConfigNET 213 and the service HalDaemon 212 is called direct dependency), while the ConfigWAS 214 is further dependent on the ConfigNET 213. Accordingly, the ConfigWAS 214 is indirectly dependent on starting the service HalDaemon 212, and this relationship is called indirect dependency. Therefore, in order to activate all activation items in the activation virtual machine I 210, the activation sequence should be stating service halDaemon 212, ConfigNET 213, and ConfigWAS 214.

Figure 2B:
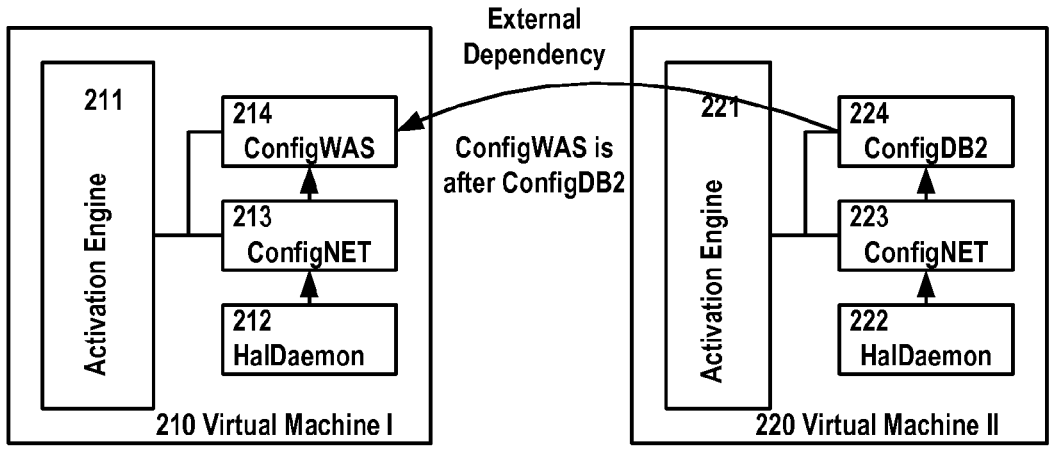

FIG. 2B illustrates a dependency relationship between the virtual machine I 210 and virtual machine II 220. Such dependency relationship between activation items of two virtual machines is called an external dependency, or "across VMs" dependency relationship. For example, in the example as illustrated in FIG. 2B, activation of the ConfigWAS 214 can only be executed after completing the activation of the ConfigDB2 224.

Figure 2C:
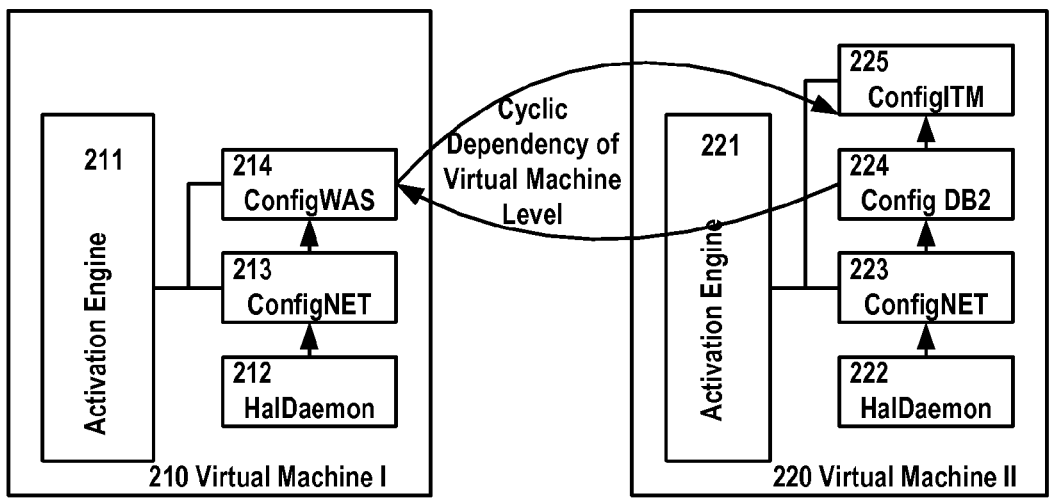

FIG. 2C illustrates that two external dependency relationships exist between the virtual machine I 210 and the virtual machine II 220. The ConfigITM 225 in the virtual machine II 220 is dependent on the ConfigWAS 214 in the virtual machine I 210, while the ConfigWAS 214 in the virtual machine I 210 is further dependent on the ConfigDB2 224 in the virtual machine II 220. Accordingly, although an explicit unidirectional dependency relationship exists between activation items, at a virtual machine level, the virtual machine I 210 and the virtual machine II 220 are mutually dependent, and this dependency relationship is called cyclic dependency.

Various kinds of dependency relationships as indicated above exist between Activation items in a virtual solution, but the prior art fails to propose activation methods for resolving the three dependency relationships as illustrated in FIGS. 2A to 2C. Local activation and distributed activation in the prior art are only suitable for the two scenarios as illustrated in FIGS. 2A and 2B, but no activation solution capable of processing a cyclic dependency has been developed yet.

In the local activation, an activation engine sets an activation sequence of various activation items based on an internal dependency relationship between activation items in a single virtual machine. At this point, no external dependency relationship across multiple virtual machines exists, and therefore, it is not required to communicate among multiple virtual machines. Local activation can only process the circumstance in which no external dependency relationship exists between various activation items of the virtual machine. However, in a practical application, complicated external dependency relationships across VMs always exist between activation items of virtual machines in a virtual solution, thus the practicality of the local activation method at this point will be greatly restricted.

Distributed activation can process an external dependency relationship as indicated in FIG. 2B, which activates each virtual machine one by one in a distributed manner and finally implements total instantiation of the virtual solution. In this embodiment, the activation engine will first activate a virtual machine where a depended activation item is located (which is virtual machine II 220 in the example of FIG. 2) based on an external dependency relationship between the activation items; and then the virtual machine I 210 on which the activation item ConfigWAS 214 locates is activated, wherein the activation item ConfigDB2 224 in the virtual machine II 220 is dependent on the activation item ConfigWAS 214. By leveraging the distributed manner, a sequence of activating various virtual machines can be determined through analyzing external dependency relationships between various activation items in the virtual machine; and then activation of the activation items in all virtual machines can be implemented in a correct sequence. However, this activation is in coarse granularity. In other words, it can only take the entire virtual machines as an activation unit, but cannot particularly set an activation sequence for an activation item in the virtual machine.

Although the distributed activation can process an external dependency relationship between activation items, in the case of cyclic dependency, it can be impossible to implement activation of all virtual machines in a virtual solution through overall activation of a series of virtual machines in sequence. An actual implementation environment always involves the scenario of cyclic dependency. Therefore, it is necessary to provide a method for activating coordinately virtual machines in a virtual solution, and this method is expected to coordinately activate multiple activation items in a virtual machine.

Figure 3:
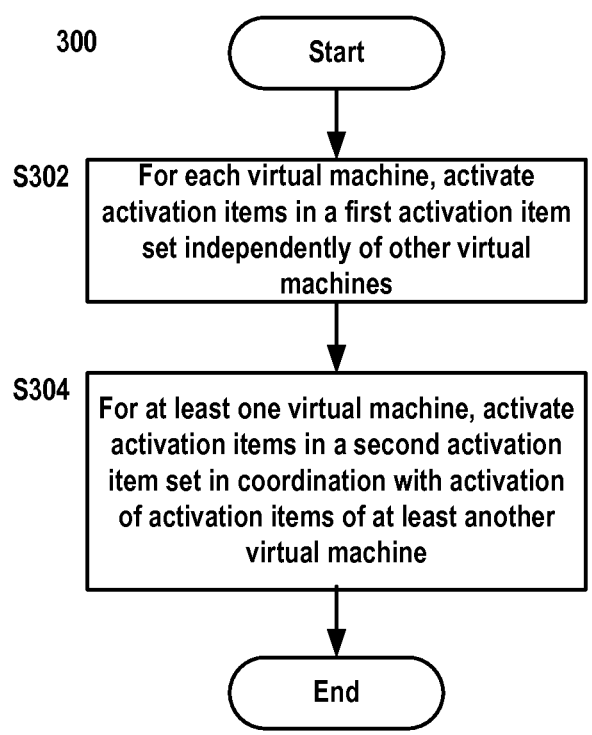
FIG. 3 schematically illustrates a flow chart of a method for activating virtual machines in a virtual solution according to one embodiment of the present invention.

FIG. 3 schematically illustrates a flow chart 300 of a method for activating virtual machines in a virtual solution according to one embodiment of the present invention. At step S302, for each virtual machine, activation items in a first activation item set are activated independently of other virtual machines. According to one embodiment of the present invention, activation items on each virtual machine in a virtual solution can be divided into two types: activation items which can be activated independently of other virtual machines, and activation items which have to be activated in coordination with other virtual machines. At the first step S302, only activation items of the first type are activated.

At step S304, for at least one virtual machine, activation items in a second activation item set are activated in coordination with activation of activation items of at least another virtual machine. A coordinated activation according to the present invention can process a cyclic dependency relationship between activation items in multiple virtual machines, thus this activation is a finer-granularity activation with each activation item in each virtual machine as an activation unit.

According to one embodiment of the present invention, a plurality of manners can be employed to activate activation items in a first activation item set independently of virtual machines. For example, a manner of registering an activation item as a service can be employed. A technical engineer can intend to register a minimum activation item set which is initially activated as a service based on his/her own experience or dependency relationships between activation items. Then, activation items registered as service will be automatically activated when the system starts, without performing dedicated activation by an activation engine on a virtual machine. Additionally, activation items in the first activation item set can also be activated through the activation engine in each virtual machine or through other apparatus. Although the activation manners are different, when activating activation items in the first activation item set independently of other virtual machines, they share a same goal of creating a network connection for a next step of coordinated activation.

Figure 4:
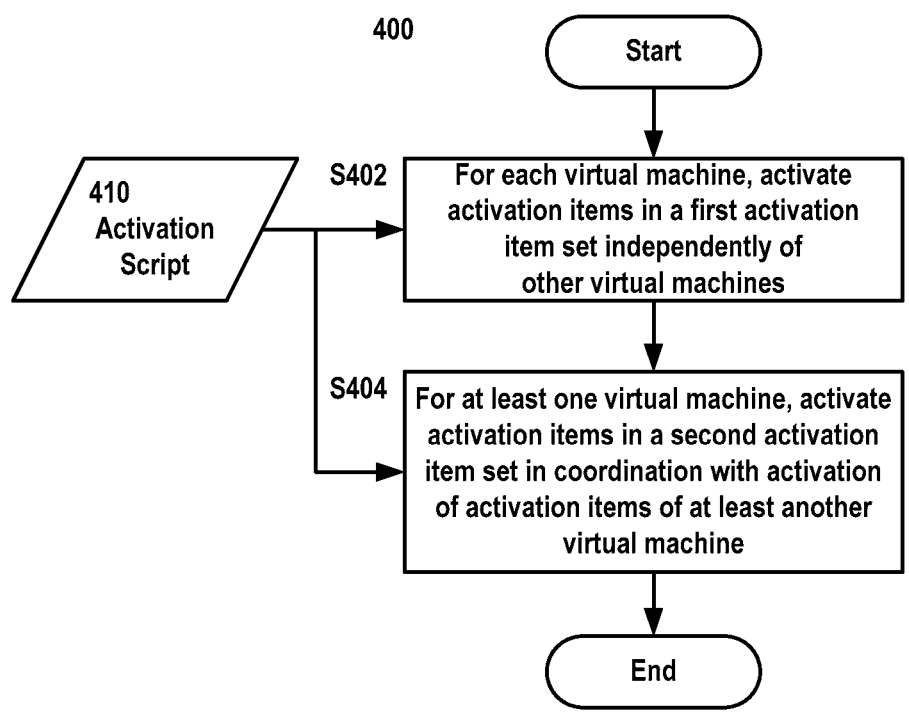
FIG. 4 schematically illustrates a flow chart of a method for activating virtual machines in a virtual solution according to another embodiment of the present invention.

FIG. 4 schematically illustrates a flow chart 400 of a method for activating virtual machines in a virtual solution according to a further embodiment of the present invention. In this embodiment, a coordinated activation for virtual machines in a virtual solution is performed based on activation script of activation items to be activated. As illustrated in FIG. 4, activation script 410 is provided as configuration information for activating various activation items. Steps S402 and S404 in FIG. 4 are similar to steps S302 and S304 as depicted in FIG. 3. At step S402, for each virtual machine, activation items in a first activation item set are activated with the activation script 410 independently of other virtual machines. Then, at step S404, for at least one virtual machine, activation items in a second activation item set are activated with the activation script 410 in coordination with activation of activation items of at least another virtual machine.

The "activation script" here is only a schematic activation manner, and embodiments of the present invention are not limited to programs compiled with a script language for activating activation items, but can further comprise, without limitation, activation programs compiled with a script language (for example, shell, python, etc.) or any other programming language (for example, Java, etc.), as long as the activation programs can attain a goal of activating the activation items in the virtual machine. Hereinafter, a process of implementing activation will be depicted with "activation script" as an example of "activation program."

According to one embodiment of the present invention, an activation script saves configuration information required for setting each activation item, for example, user information of a software assembly corresponding to an activation item, system variant information, and other parameters required to set. For example, when activating the virtual machine I 210 and virtual machine II 220 as illustrated in FIG. 2B, the activation script can be presented as in Table 1:

TABLE 1

Example of Activation Script

| No. | Virtual Machine | Activation Item or Service | Activation Parameters |
|---|---|---|---|
| 1 | Virtual machine I | HalDaemon | . . . |
| 2 | Virtual machine I | ConfigNET | . . . |
| 3 | Virtual machine I | ConfigWAS | . . . |
| 4 | Virtual machine II | HalDaemon | . . . |
| 5 | Virtual machine II | ConfigNET | . . . |
| 6 | Virtual machine II | ConfigDB2 | . . . |

Table 1 only illustrates a schematic example of an activation script. The embodiments of the present invention can store activation script data with any pre-defined data structure according to system design, as long as the data structure saves complete parameter configurations for activating various activation items in a virtual solution. A dedicated activation script editor can also be designed for providing convenience for adding, deleting, or modifying parameter configurations for activation items in the activation script. According to one embodiment of the present invention, an activation script can also be saved in an activation engine of each virtual machine, and in this case, only activation parameters correlated to activating the activation items in this virtual machine are required.

Figure 5:
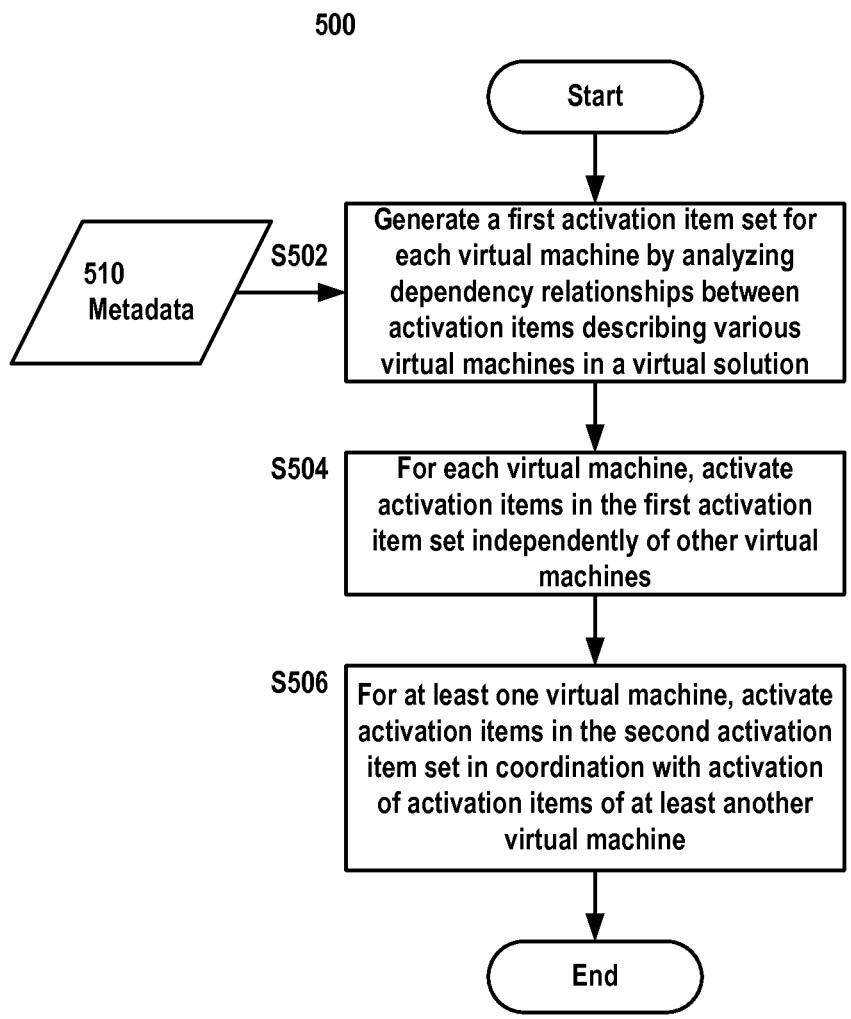
FIG. 5 schematically illustrates a flow chart of a method for activating virtual machines in a virtual solution according to a further embodiment of the present invention.

FIG. 5 schematically illustrates a flow chart 500 of a method for activating virtual machines in a virtual solution according to a further embodiment of the present invention.

According to one embodiment of the present invention, a first activation item set and a second activation item set can be determined based on metadata. As indicated at step S502, the first activation item set is generated for each virtual machine by analyzing dependency relationships between activation items describing various virtual machines in a virtual solution.

Dependency relationships between activation items of various virtual machines can be obtained based on metadata 510. Metadata 510 are data that describe activation items in a virtual machine and dependency relationships between various activation items. In the case of existence of an external dependency relation in a virtual solution as illustrated in FIG. 2, for example, an XML language can be used for description, and metadata of the virtual machine I and the virtual machine II are presented in Table 2 and Table 3, respectively:

TABLE 2

Metadata for Virtual Machine I 210 in FIG. 2B

```
<?xml version="1.0" encoding="UTF-8"?>
<al2:Activation xmlns:al2="http://www.ibm.com/xmlns/ovf/activation/al2">
    <VirtualSystem id="HypervisorEdition">
        <Info>Activate this beast</Info>
        <ProductActivation class="ConfigNET">
            <Program href="AS/ConfigNET.sh"/>
            <Service name="activation.ConfigNET">
                <RunLevel value="2"/>
            </Service>
            <OSServiceDependency serviceName="haldaemon"/>
        </ProductActivation>
        <ProductActivation class="ConfigWAS">
            <Program href="AS/ConfigWAS.sh"/>
            <ProductDependency class="vm2.ConfigDB2"/>
        </ProductActivation>
    </VirtualSystem>
</al2:Activation>
```

TABLE 3

Metadata for Virtual Machine II 220 in FIG. 2B

```
<?xml version="1.0" encoding="UTF-8"?>
<al2:Activation xmlns:al2="http://www.ibm.com/xmlns/ovf/activation/al2">
    <VirtualSystem id="HypervisorEdition">
        <Info>Activate this beast</Info>
        <ProductActivation class="ConfigNET">
            <Program href="AS/ConfigNET.sh"/>
            <Service name="activation.ConfigNET">
                <RunLevel value="2"/>
            </Service>
            <OSServiceDependency serviceName="haldaemon"/>
        </ProductActivation>
        <ProductActivation class="ConfigDB2">
            <Program href="AS/ConfigDB2.sh"/>
        </ProductActivation>
    </VirtualSystem>
</al2:Activation>
```

AL language is only an example for illustrative purpose, and in the embodiments of the present invention, metadata in any format can be customized, as long as they can describe activation items of each virtual machine and dependency relationships between the activation items. In an example for the virtual solution as illustrated in FIG. 2B, it is seen from analyzing the metadata in Table 2 that the ConfigNET 213 in the virtual machine I 210 is dependent on the service HalDaemon 212, while ConfigWAS 214 is further dependent on ConfigDB2 224 in another virtual machine II 220.

It can be seen from analyzing the metadata in Table 3 that activation item 223 of the virtual machine II 220 is dependent on service HalDaemon 212, while ConfigDB2 224 is not externally dependent on activation items of other virtual machines. When generating a first activation item, for each virtual machine, the service HalDaemon and activation item ConfigNET can be added into the first activation item set. Next, at step S504, service HalDaemon in each virtual machine can be first started independently of activation items in other virtual machines, with the ConfigNET being activated; while at step S506, for at least one virtual machine, activation items in the second activation item set are activated in coordination with activation of activation items of at least another virtual machine.

According to one embodiment of the present invention, activation items that are outside of the first activation item set can be added into the second activation item set. For example, in the example as depicted above with reference to FIG. 2B, the second activation item set of the virtual machine I 210 can comprise ConfigWAS 214, while the second activation item set of the virtual machine II 220 can comprise ConfigDB2 224.

According to one embodiment of the present invention, whether a network connection is required when activating an activation item in a virtual machine can be used as a criterion for determining whether this activation item can be activated independently of other virtual machines. A design principle for this method lies in that to activate an activation item having an external dependency relationship must be dependent on a network connection, while how to establish the network connection as early as possible is fundamental to execute subsequent activating operation.

For each virtual machine, activation items, on which a configuring network connection is dependent (including direct dependency and indirect dependency), are added into a first activation item set. At this point, activation items in the first activation item set are all fundamental for configuring a network connection. The first activation item set can be built in this manner so as to find a minimum activation item set on which establishing the network connection is dependent. For other activation items, they can be activated after the network connection is established. To activate in this way can guarantee that the first activation item set has minimal activation items, and network connection can be established only by activating the activation items in this first activation item set, so as to create conditions for subsequent coordinated activation.

According to one embodiment of the present invention, a first activation item can also comprise an activation item that is independent from establishing a network connection and has no external dependency relationships, i.e., an activation item that needs no coordination across virtual machines. An activation item needing no coordination across virtual machines, for example, can comprise an activation item having no internal dependency relationships with other activation items in the present virtual machine, and can further comprise an activation item only having internal dependency relationships with other activation items in the present virtual machine. Activation of a virtual machine can consider comprehensively the relationship between a first activation item set and a second activation item set, and add activation items needing no coordination across virtual machines into the first activation item set or the second activation item set as required. For the purpose of establishing a network connection in a quickest way, the first activation item set can include minimal amount of activation items correlated to establishment of the network connection, but it does not exclude further comprising other activation items.

According to one embodiment of the present invention, when activating the activation items in the first activation item set and the second activation item set, various activation items in each virtual machine can be activated sequentially in series, or activated simultaneously in parallel. For example, if the first activation item set comprises two activation items having no dependency relationship there between, the two activation items can be simultaneously activated in parallel.

For each virtual machine, after activation items in the first activation item set have been activated, a network connection has been successfully established among various virtual machines in the virtual solution, and then activation can be performed coordinately based on dependency relationships between activation items in respective virtual machines.

According to one embodiment of the present invention, activating activation items in the second activation item set includes: for each virtual machine, activating, based on the dependency relationships, activation items directly dependent on the activation items in the first activation item set and other activation items one by one till all activation items in the second activation item set are activated. Hereinafter, a method for activating activation items in the second activation item set will be described in detail with reference to FIG. 6.

Figure 6:
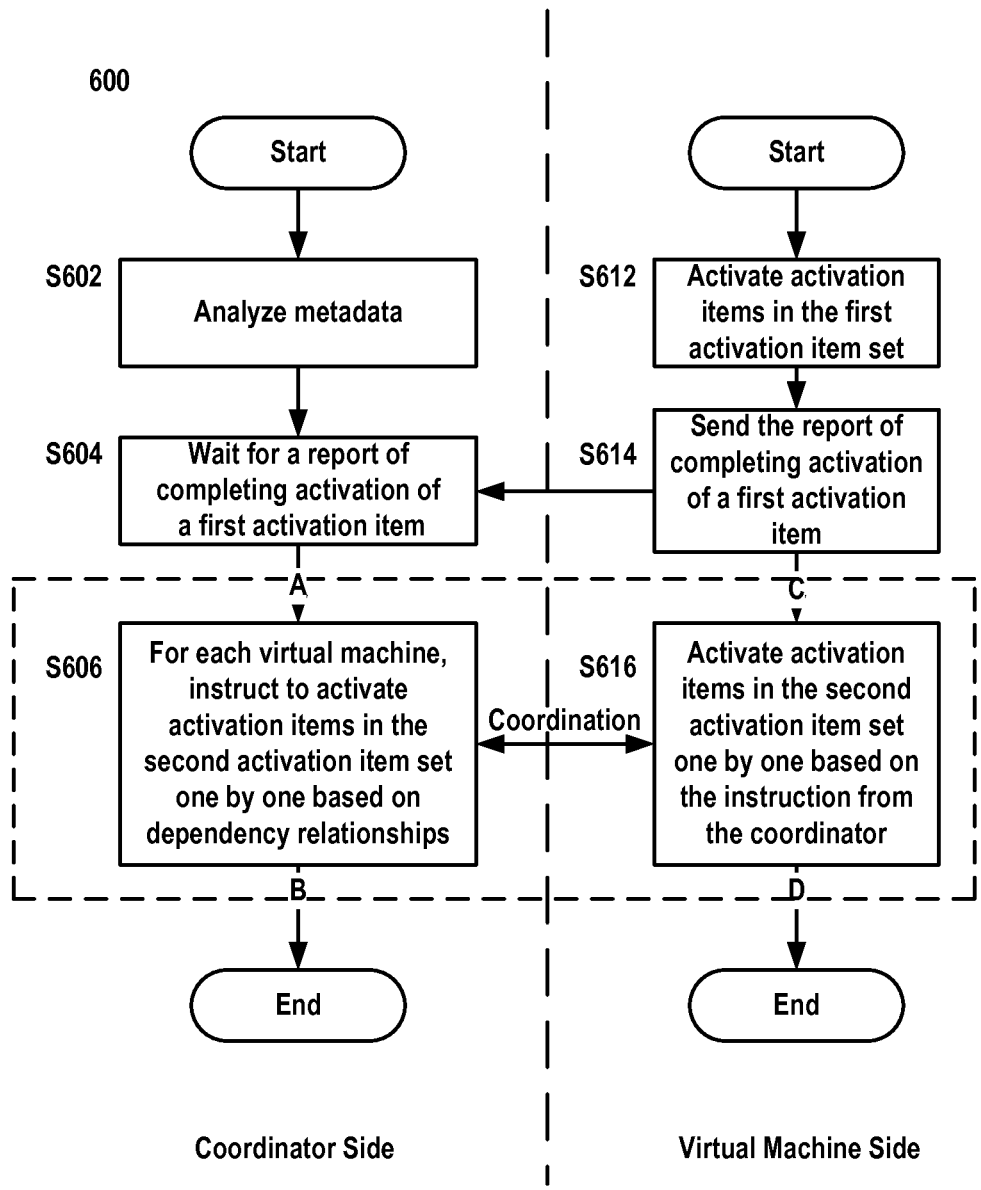
FIG. 6 schematically illustrates a flow chart of a method for activating activation items of a virtual machine coordinately according to another embodiment of the present invention.

FIG. 6 schematically illustrates a flow chart 600 of a method for coordinately activating activation items of a virtual machine according to another embodiment of the present invention. During a coordinated activation process, a coordinator is set to manage scheduling work correlated to the coordinated activation of activation items in various virtual machines.

An activation engine can be set in each virtual machine, for managing activation issues in respective virtual machines and communicating with the outside. In the schematic flow chart of FIG. 6, the left side illustrates an operation at the coordinator side, while the right side illustrates an operation at the virtual machine side. Although the right side merely illustrates an operation flow of one virtual machine, the method is not limited to one virtual machine, but can relate to any amount of multiple virtual machines.

The left side of FIG. 6 illustrates a schematic flow for the coordinator to coordinately activate activation items in multiple virtual machines. At step S602, metadata are analyzed and dependency relationships between various activation items are determined according to the methods mentioned above. In the virtual machine side as illustrated in the right side of FIG. 6, at step S612, an activation engine in a virtual machine activates activation items in the first activation item set, and at step S614, a report of having completed activation of the activation items in the first activation item set is sent to the coordinator side.

As illustrated in the left side of FIG. 6, at step S604, the coordinator will wait for the report of having completed activation of activation items in the first activation item set from each virtual machine. When the coordinator receives the report from a virtual machine, it indicates that this virtual machine has completed the configurations of establishing a network connection. After receiving reports from all virtual machines, it indicates that all virtual machines in the virtual solution have successfully established network connection, and then a coordinated activation operation among all virtual machines in the virtual solution can be performed in the next step.

According to one embodiment of the present invention, when the coordinator has received reports from a part of virtual machines, a coordinated activation can also be executed among this part of virtual machines which have established network connection. And when the coordinator receives reports from other virtual machines, these other virtual machines are just added. The following situation can exist: if activation items in a virtual machine have no external dependency relationships, then whether the coordinator has received a report from the virtual machine at this point will not substantively affect the subsequent coordinated activation operation; and if a virtual machine has not completed activation of the first activation item set yet, while activation items in the second activation item set of a virtual machine which has established network connection are dependent on the activation items in the virtual machine which has not completed activation yet, then the coordinator needs to wait for the report from the virtual machine which has not completed activation yet so as to perform subsequent operation.

In other words, in one embodiment, it is unnecessary for the coordinator to wait for reception of reports from all virtual machines in the virtual solution before performing the coordinated activation within the scope of all virtual machines, but the coordinator can first perform the coordinated operation only among a part of virtual machines which have established network connection.

According to one embodiment of the present invention, more flexibility is further provided. For example, it is allowed to add, through editing metadata, a new virtual machine into a virtual solution, a new activation item into a virtual machine, or a new dependency relationship. When a new virtual machine is added into a virtual solution, steps S602 to S604 and steps S612 and s614 as illustrated in FIG. 6 are performed on the coordinator and the newly added virtual machine, respectively.

Steps S606 and S616 in the dash-line block of FIG. 6 illustrate a coordination process between the coordinator and each virtual machine having sent the activation report. Namely, at step S606, for each virtual machine, the coordinator instructs to activate all activation items in the second activation item set one by one based on dependency relationships, while at the virtual machine side, at step S616, the virtual machine activates all activation items in the second activation item set one by one based on instructions from the coordinator.

According to one embodiment of the present invention, a coordinator can have metadata that describe activation items of all virtual machines in a virtual solution and their dependency relationships.

Continuing for the virtual solution as illustrated in FIG. 2, Table 4 schematically illustrates an example of metadata at the coordinator side.

TABLE 4

```
<?xml version="1.0" encoding="UTF-8"?>
<al2:Activation xmlns:al2="http://www.ibm.com/xmlns/ovf/activation/al/2">
    <VirtualSystem id="HypervisorEdition">
      <Info>Activate this beast</Info>
      <ProductActivation class="ConfigNET">
          <Program href="AS/ConfigNET.sh"/>
          <Service name="activation.ConfigNET">
            <RunLevel value="2"/>
          </Service>
          <OSServiceDependency serviceName="haldaemon"/>
      </ProductActivation>
      <ProductActivation class="ConfigDB2">
          <Program href="AS/ConfigDB2.sh"/>
      </ProductActivation>
    </VirtualSystem>
    <VirtualSystem id="HypervisorEdition">
      <Info>Activate this beast</Info>
      <ProductActivation class="ConfigNET">
          <Program href="AS/ConfigNET.sh"/>
```

TABLE 4-continued

```
          <Service name="activation.ConfigNET">
            <RunLevel value="2"/>
          </Service>
          <OSServiceDependency serviceName="haldaemon"/>
      </ProductActivation>
      <ProductActivation class="ConfigWAS">
          <Program href="AS/ConfigWAS.sh"/>
          <ProductDependency class="vm2.ConfigDB2"/>
      </ProductActivation>
    </VirtualSystem>
</al2:Activation>
```

The coordinator can be located at different positions. For example, the coordinator can be located inside a virtual machine or at other position outside the virtual machine. When the coordinator is located inside a virtual machine, each virtual machine in a virtual solution can have a coordinator therein, while one virtual machine is voted out by various virtual machines in a particular manner and the coordinator therein is set to "on," and the coordinators in other virtual machines are set to an "off" state. At this point, although each virtual machine has a code of the coordinator, only the code in one virtual machine is in a working state.

When the coordinator is located outside the virtual machine, the coordinator can be set on a physical device which is identical to or different from the physical machine where the virtual machine is located, or set on a physical device identical to or different from the physical machine where a virtual image library is located, as long as the coordinator, when working, can correctly establish network connection with various virtual machines and can correctly perform coordinate operation.

According to one embodiment of the present invention, for each virtual machine, an activation sequence of various activation items in the second activation item set in the overall activation sequence can be determined; activation messages are sent to corresponding virtual machines based on the activation sequence, and results of activation of activation items, corresponding to the activation messages, are received. Hereinafter, it will be described in detail with reference to FIG. 7.

Figure 7:
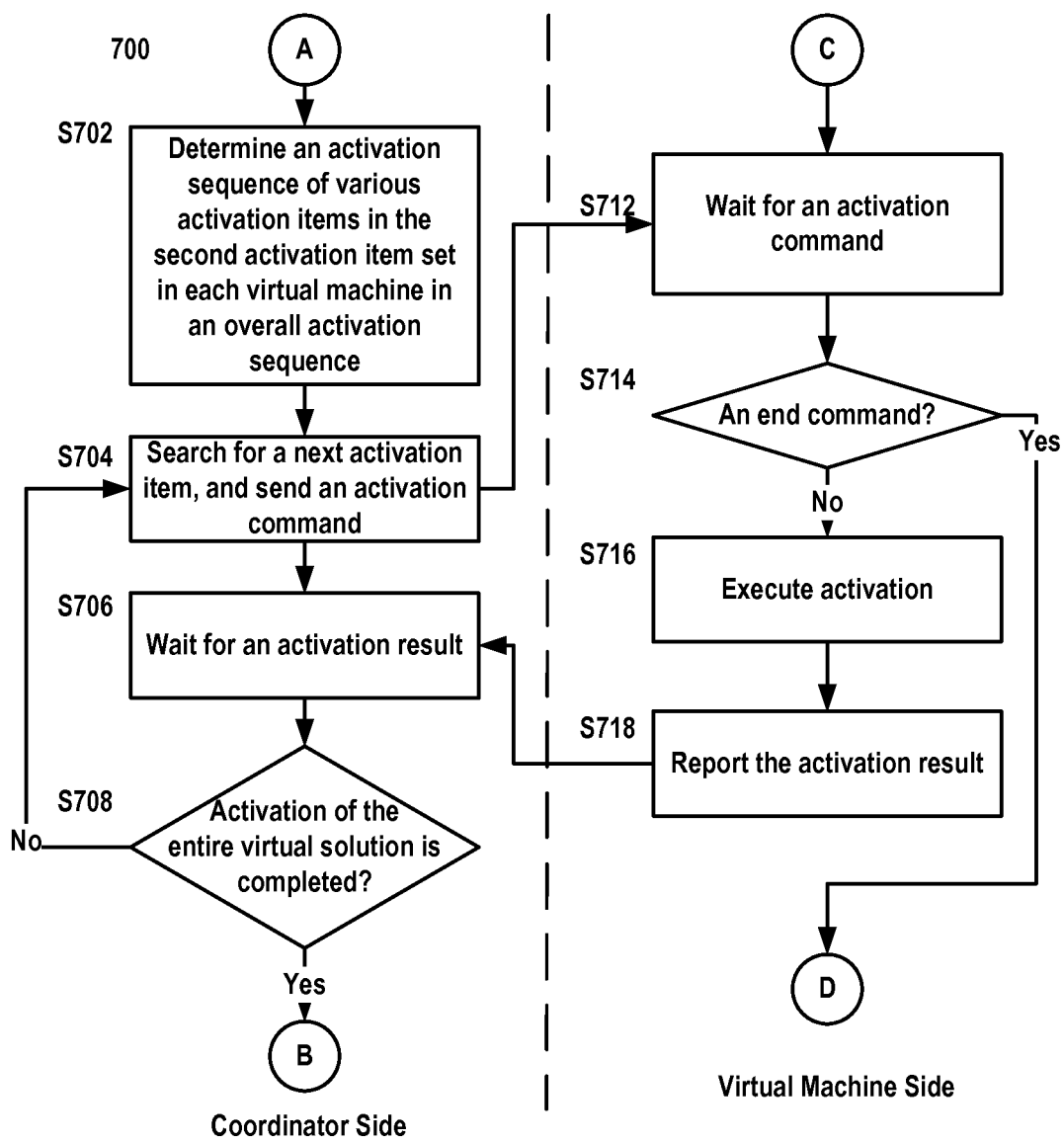
FIG. 7 schematically illustrates a flow chart of a method for activating activation items of a virtual machine in a dummy manner according to another embodiment of the present invention.

FIG. 7 schematically illustrates a flow chart 700 of a method for activating activation items of a virtual machine in a dummy manner according to another embodiment of the present invention. The flow chart of FIG. 7 is details of the coordinated activation operation in the dash-line block section of the flow chart of FIG. 6, wherein the start point A and the end point B in the left flow chart of FIG. 7 correspond to point A and point B in the dash-line block of FIG. 6, respectively, while the start point C and end point D in the right flow chart of FIG. 7 correspond to point C and point D in the dash-line block of FIG. 6. Marks A, B, C, and D in the flow chart of FIG. 8 have the same meaning, which will not be detailed here.

In the dummy manner, a coordinator uniformly executes central control, i.e., determining, based on metadata in the coordinator (for example, as illustrated in Table 4), execution sequence for various activation items in the second activation item set in each virtual machine, and sending an activation command to corresponding virtual machines based on the execution sequence; and reporting completion of activation to the coordinator after a virtual machine activates a relevant activation item based on a message from the coordinator. At this point, the coordinator further sends a command for activating a next activation item based on the execution sequence till activation of the entire virtual solution is completed.

As illustrated at the left side of FIG. 7, at step S702, the coordinator determines a sequence of various activation items in the second activation item set in each virtual machine in an overall activation sequence. For example, for the example as illustrated in FIG. 2C, the coordinator can determine through metadata analysis the second activation item sets of the virtual machine I and virtual machine II to be:

The second activation item of the virtual machine I: {ConfigWAS};

The second activation item of the virtual machine II: {ConfigDB2, ConfigITM}.

In this example, ConfigWAS is dependent on ConfigDB2, while ConfigITM is dependent on ConfigWAS; therefore, it is seen that the overall activation sequence should be ConfigDB2→ConfigWAS→ConfigITM. Therefore, the coordinator can send an activation command to corresponding virtual machines one by one according to this sequence.

At step S704, a virtual machine searches for a next activation item ("ConfigDB2" in the above example) and sends the activation command to the virtual machine II associated with the "ConfigDB2." As illustrated in the right side of FIG. 7, at step S712, the virtual machine waits for the activation command. When receiving the activation command from the coordinator, at step S714, whether the command is an end command is determined; if not, the flow proceeds to step S716, while if yes, it indicates that all activation items in the second activation item set of this virtual machine have been activated. For example, the virtual machine II activates the activation item "ConfigDB2" at step S716, and reports the completion of activation to the coordinator S718, and then continues to wait for the activation command.

As illustrated at the left side of FIG. 7, the coordinator waits for an activation result at step S706; when receiving an activation result, whether activation of the entire virtual solution has been completed is determined at step S708; if not completed yet, then the flow returns to step S704 to search a next activation item and repeat the above operations; if already completed, it indicates that activation of the entire virtual solution has been completed. In the above activation sequence "ConfigDB2→ConfigWAS→ConfigITM," the next activation item is "ConfigWAS," then the coordinator sends the activation command to the virtual machine I associated with the activation item ConfigWAS and cyclically performs the above operation till all activation items in the activation sequence are activated sequentially.

In the dummy manner, a virtual machine does not need to analyze dependency relationships between activation items, but just waits for an activation command from a coordinator and then activates corresponding activation items and reports activation results to the coordinator; while the coordinator performs analysis on the dependency relationships and determines coordinate operations with an activation sequence.

According to one embodiment of the present invention, when an activation item on which an activation item that has not been activated is dependent is activated, the coordinator can send a notice on state update, and receive a result regarding the activation item dependent on the state update being activated. This process will be described in detail with reference to FIG. 8.

Figure 8:
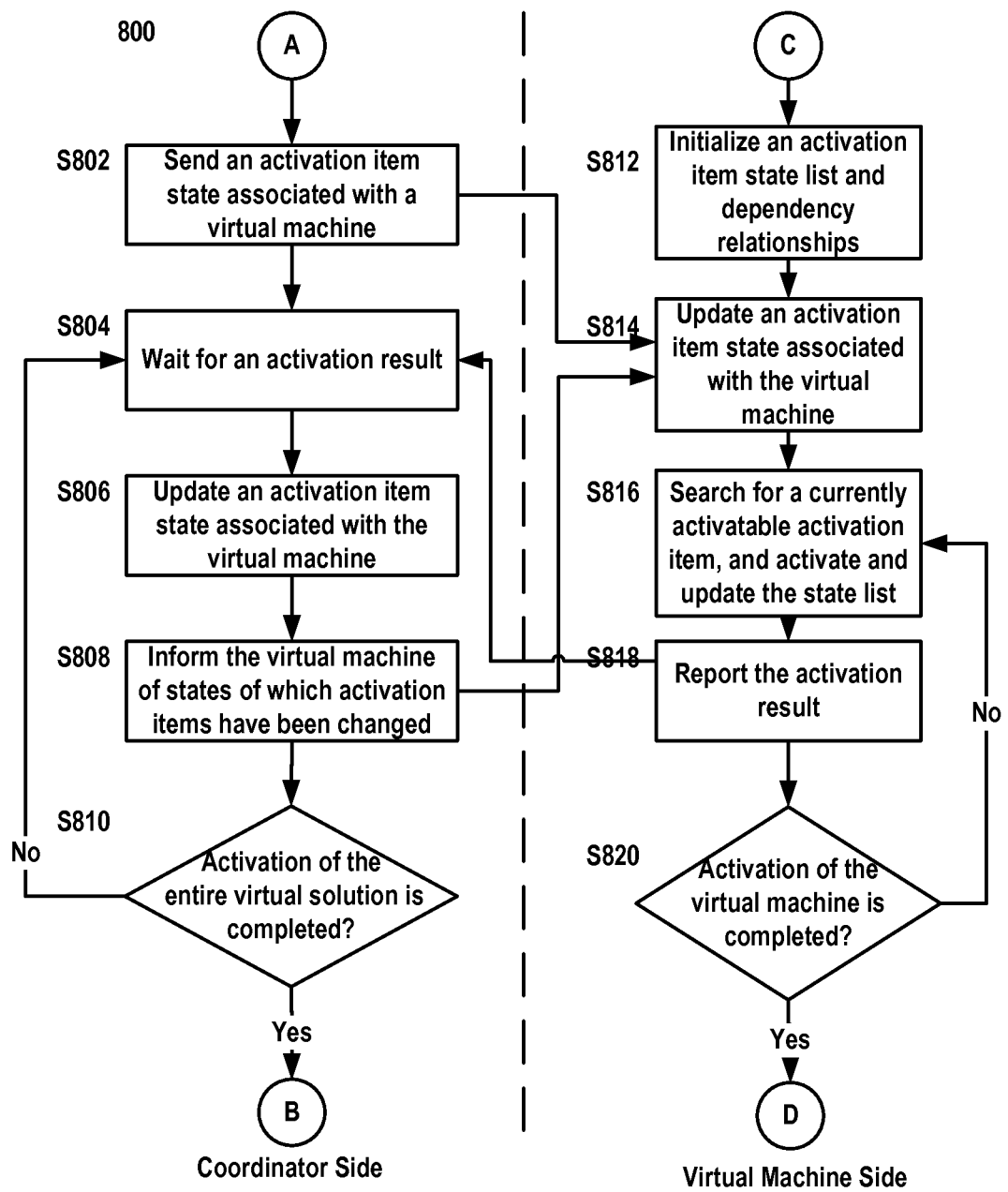
FIG. 8 schematically illustrates a flow chart of a method for activating activation items of a virtual machine in an autonomous manner according to another embodiment of the present invention.

FIG. 8 schematically illustrates a flow chart 800 of a method for activating activation items of a virtual machine in an autonomous manner according to another embodiment of the present invention. In the autonomous manner, a coordinator informs each virtual machine of a state of an activation item on which an activation item in the virtual machine is dependent; while an activation engine in each virtual machine determines which activation items can be activated and which activation items cannot be activated based on the state, and reports an activation result to the coordinator after activating those activation items which can be activated; and the coordinator updates states of various activation items, and notifies a corresponding virtual machine based on a new activation state, till the completion of activation of the entire virtual solution.

In one embodiment, it is necessary to maintain the following information at the coordinator side and the virtual machine sides, respectively: a state list of various activation items in virtual machines, and dependency relationships between various activation items. At the coordinator side, the state list maintains states of activation items in the second activation item set in all virtual machines in the virtual solution, as well as dependency relationships between the activation items in the second activation item set in all virtual machines in the virtual solution, while it is only required to maintain the state list of the activation items in the second activation item set in the virtual machine itself, as well as the dependency relationships between various activation items at a virtual machine side. Upon initiation, the states for respective activation items in the state lists at the coordinator side and respective virtual machine sides are all "Not Activated" (i.e., having not been activated). At a virtual machine side, when the virtual machine activates an activation item that can be activated, the state of the activation item is set to "activated," while at the coordinator side, the coordinator sets the state of the corresponding activation item as "activated" in response to reception of an activation result from the virtual machine.

As illustrated at the left side of FIG. 8, at step S802, the coordinator sends an activation item state associated with the virtual machine. As illustrated at the right side of FIG. 8, at step S812, the virtual machine first initializes an activation item state list and dependency relationships, and at step S814, it can update the state list of itself with the activation item state from the coordinator. In one embodiment, a virtual machine itself can not generate a dependency relationship or a state list, but receives the dependency relationship and state list from the coordinator; or a virtual machine can generate a dependency relationship and a state list by itself, therefore it is unnecessary to receive the dependency relationship and state list sent from the coordinator upon initialization; or various virtual machines can generate their respective state list and dependency relationship by themselves and send them to the coordinator, while the coordinator generates a state list and a dependency relationship at the coordinator side through summarizing the respective state lists and dependency relationships.

As illustrated at the right side of FIG. 8, at step S816, the virtual machine searches for an activation item that can be currently activated and executes activation, and after activation, at step S818, it reports the activation result to the coordinator. The coordinator waits for the activation result at step S804, and updates the recently activated activation item state at step S806, and informs relevant virtual machines of states of which activation items have been changed at step S808. At step S810, if activation of an entire virtual solution has not been completed yet, then the flow returns to step S804; and if it has been completed, then the process at the coordinator side ends.

At step S814, the virtual machine updates the state list of the activation items in the present virtual machine in response to reception of a notification of state change, and searches for an activation item that can be currently activated at step S816. Its operation manner is completely identical to what is previously mentioned, till activation of the entire virtual machines has been completed, which will not be detailed here.

Now, the operation flow of FIG. 8 will be explained in detail with the virtual solution in FIG. 2C as an example.

As mentioned above:

The second activation item of the virtual machine I: {ConfigWAS};

The second activation item of the virtual machine II: {ConfigDB2, ConfigITM}.

In this example, ConfigWAS is dependent on ConfigDB2, while ConfigITM is dependent on ConfigWAS; therefore, it is seen that the overall activation sequence should be ConfigDB2→ConfigWAS→ConfigITM.

At the initialization, the state lists of the virtual machine I, virtual machine II, and coordinator are illustrated in Table 5, Table 6, and Table 7, respectively:

TABLE 5

State List of Virtual Machine I

| No. | Activation Item | State |
| --- | --- | --- |
| 1 | ConfigWAS | Not Activated |

TABLE 6

State List of Virtual Machine II

| No. | Activation Item | State |
| --- | --- | --- |
| 1 | ConfigDB2 | Not Activated |
| 2 | ConfigITM | Not Activated |

TABLE 7

State List of the Coordinator

| No. | Virtual Machine | Activation Item | State |
| --- | --- | --- | --- |
| 1 | Virtual machine I | ConfigWAS | Not Activated |
| 2 | Virtual machine II | ConfigDB2 | Not Activated |
| 3 | Virtual machine II | ConfigITM | Not Activated |

At this point, each virtual machine searches for an activation item, which can be currently activated, based on a dependency relationship. The virtual machine I finds that the activation item ConfigWAS is externally dependent on ConfigDB2, and thus has to wait for the coordinator to notify that the ConfigDB2 has been activated before activating the ConfigWAS. The virtual machine II finds that the activation condition for ConfigDB2 has been mature, and then activates the ConfigDB2 and updates the state list as illustrated in Table 6 (i.e., modifying the state of the ConfigDB2 to "activated"), and reports the coordinator thereafter that the ConfigDB2 in the virtual machine II has been activated. The coordinator modifies its own state list (i.e., modifying the state of the ConfigDB2 in the virtual machine II to "activated") in response to reception of the result that the ConfigDB2 in virtual machine II has been activated.

At this point, the virtual machine I updates its own state list in response to reception of the message indicating that the state of the ConfigDB2 has been updated as "activated," and knows that it can activate the ConfigWAS based on the dependency relationship, and further activates the ConfigWAS and modifies the state list, etc. Each virtual machine and coordinator repeats execution of the above steps till the entire virtual solution is activated.

The above example only illustrates an example having a single dependency. In a practical scenario, there can be a situation in which one activation item (for example, A) is dependent on a plurality of activation items (B1, B2, . . . , Bn) simultaneously, and at this point, the activation item A can only be activated after the plurality of activation items B1, B2, . . . , and Bn have been activated.

Although the above example illustrates a scenario that ConfigDB2, ConfigWAS, and ConfigITM are activated one by one in sequence, when a plurality of virtual machines have at least one activation item that can be activated, respectively, their respective at least one activation item can be activated simultaneously in the plurality of virtual machines. Additionally, when there are a plurality of activation items that can be activated in a virtual machine simultaneously, the plurality of activation items can be activated simultaneously. In other words, at least one activation item in at least one virtual machine can be activated in series, in parallel, or in combination of both, and the method according to the present invention does not limit the activation sequence of a plurality of activation items which satisfy an activation condition. In the autonomous activation manner, the specific activation sequence is determined by respective virtual machine itself.

Figure 9:
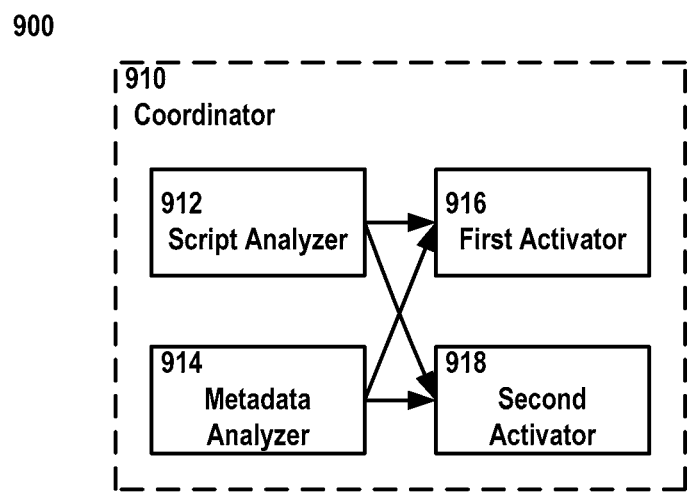
FIG. 9 schematically illustrates a diagram of an apparatus for activating virtual machines in a virtual solution according to one embodiment of the present invention.

FIG. 9 schematically illustrates a diagram of an apparatus 900 for activating virtual machines in a virtual solution according to one embodiment of the present invention. As illustrated in FIG. 9, a coordinator 910 can include: a script analyzer 912, a metadata analyzer 914, a first activator 916, and a second activator 918. The script analyzer 912 for analyzing a read activation script, a metadata analyzer 914 for analyzing read metadata and interpreting the metadata into dependency relationships between activation items in a virtual machine in the virtual solution.

The first activator 916 is for activating activation items in a first activation item set in each virtual machine. The first activator 916 can further include means for generating the first activation item set based on the dependencies derived by the metadata analyzer 914, wherein, for each virtual machine, the first activator 916 activates the activation items in the first activation item set independently of other virtual machines based on script parameters obtained from the script analyzer 912.

The second activator 918 is for activating activations in a second item set in each virtual machine. The second activator 918 can further include means for generating the second activation item set based on all activation items of each virtual machine and the first activation item set. The second activator 918 is for activating, for at least one virtual machine, activation items in a second activation item set in coordination with activation of activation items of at least another virtual machine.

According to another embodiment of the present invention, the first activator and the second activator perform activation based on activation script of activation items to be activated.

The apparatus according to another embodiment of the present invention further includes a first activation set generator for generating a first activation item set for each virtual machine by analyzing dependency relationships between activation items describing various virtual machines in the virtual solution.

By using various embodiments of the present invention, even a virtual solution relates to multiple virtual machines and software products on the multiple virtual machines have complicated dependencies, for example, cyclic dependencies, various virtual machines in the virtual solution can also be activated conveniently and quickly.

The present invention can adopt a form of hardware embodiment, software embodiment or one embodiment including hardware components and software components. In a preferred embodiment, the present invention is implemented as software, including, without limitation to, firmware, resident software, micro-code, etc.

Moreover, the present invention can be implemented as a computer program product usable from computers or accessible by computer-readable media that provide program code for use by or in connection with a computer or any instruction executing system. For the purpose of description, a computer-usable or computer-readable medium can be any tangible means that can contain, store, communicate, propagate, or transport the program for use by or in connection with an instruction execution system, apparatus, or device.

The medium can be an electric, magnetic, optical, electro-magnetic, infrared, or semiconductor system (apparatus or device), or propagation medium. Examples of the computer-readable medium can include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system suitable for storing or executing program code can include at least one processor that is coupled to a memory element directly or via a system bus. The memory element can include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) can be coupled to the system directly or via an intermediate I/O controller.

A network adapter can also be coupled to the system such that the data processing system can be coupled to other data processing systems, remote printers or storage devices via an intermediate private or public network. A modem, a cable modem, and an Ethernet card are merely examples of a currently usable network adapter.

It can be understood from the foregoing description that modifications and alterations can be made to the respective embodiments of the present invention without departing from the true spirit of the present invention. The description in the present specification is intended to be illustrative and not limiting. The scope of the present invention is limited by the appended claims only.

What is claimed is:

1. A method for activating virtual machines in a virtual solution, comprising:
   activating activation items in a first activation item set independently of other virtual machines for each virtual machine;
   activating activation items in a second activation item set in coordination with activation of activation items of at least another virtual machine for at least one virtual machine; and
   generating the first activation item set for each virtual machine by analyzing dependency relationships between activation items describing various virtual machines in the virtual solution;
   wherein activating activation items in the second activation item set for each virtual machine in the at least one virtual machine comprises activating, one by one, based on the dependency relationships, activation items in the second activation item set that are directly dependent on the activation items in the first activation item set, and activating, one by one, activation items in the second activation item set that are indirectly dependent on activation items in the first activation item set, until all activation items in the second activation item set have been activated.

2. The method according to claim 1, wherein the activating is performed based on an activation script of an activation item to be activated.

3. The method according to claim 1, wherein the dependency relationships of the activation items comprise internal dependencies between activation items within a single virtual machine.

4. The method according to claim 1, wherein the dependency relationships of the activation items comprise external dependencies between activation items of multiple virtual machines.

5. The method according to claim 4, wherein the external dependencies comprise cyclic dependencies.

6. The method according to claim 1, further comprising:
   adding activation items that are outside of the first activation item set in each virtual machine, into the second activation item set.

7. The method according to claim 1, wherein generating the first activation item set for each virtual machine comprises:
   adding activation items on which a configuring network connection is dependent, into the first activation item set.

8. The method according to claim 1, wherein the activating one by one comprises:
   determining an activation sequence of each activation item in the second activation item set in an overall activation sequence, for each virtual machine;
   sending an activation message to a corresponding virtual machine based on the activation sequence; and
   receiving a result indicating that an activation item corresponding to the activation message is activated.

9. The method according to claim 1, wherein the activating one by one for each virtual machine comprises:
   sending a notification of state update when an activation item, on which an activation item that has not been activated is dependent, is activated; and
   receiving a result indicating that an activation item dependent on the state update is activated.

* * * * *